United States Patent
Lee et al.

(10) Patent No.: US 12,325,125 B2
(45) Date of Patent: Jun. 10, 2025

(54) MANIPULATOR AND METHOD FOR CONTROLLING THEREOF

(71) Applicant: SAMSUNG ELECTRONICS CO., LTD., Suwon-si (KR)

(72) Inventors: Hansung Lee, Suwon-si (KR); Hyungmin Son, Suwon-si (KR); Leo Jun, Suwon-si (KR); Jiwon Paik, Suwon-si (KR); Sajid Sadi, Mountain View, CA (US); Jeannie Kang, Seoul (KR); Minyoung Lee, Suwon-si (KR); Yenah Lee, Suwon-si (KR)

(73) Assignee: SAMSUNG ELECTRONICS., LTD., Suwon-si (KR)

( * ) Notice: Subject to any disclaimer, the term of this patent is extended or adjusted under 35 U.S.C. 154(b) by 183 days.

(21) Appl. No.: 18/305,671

(22) Filed: Apr. 24, 2023

(65) Prior Publication Data
US 2023/0256587 A1 Aug. 17, 2023

Related U.S. Application Data

(63) Continuation of application No. PCT/KR2022/009633, filed on Jul. 5, 2022.

(30) Foreign Application Priority Data

Jul. 21, 2021 (KR) .................. 10-2021-0095697
Jan. 7, 2022 (KR) .................. 10-2022-0002833

(51) Int. Cl.
  *B25J 13/08* (2006.01)
  *B25J 3/04* (2006.01)
  *B25J 9/16* (2006.01)
(52) U.S. Cl.
  CPC .............. *B25J 3/04* (2013.01); *B25J 9/1612* (2013.01); *B25J 13/088* (2013.01)

(58) Field of Classification Search
  CPC . B25J 3/04; B25J 9/1612; B25J 13/088; B25J 9/1664; B25J 9/1694;
  (Continued)

(56) References Cited

U.S. PATENT DOCUMENTS

| 7,410,338 B2 | 8/2008 | Schiele et al. |
| 8,106,911 B2 | 1/2012 | Gordon |

(Continued)

FOREIGN PATENT DOCUMENTS

| CN | 110815258 | 3/2023 |
| JP | 61-7905 | 1/1986 |

(Continued)

OTHER PUBLICATIONS

International Search Report for PCT/KR2022/009633 mailed Oct. 26, 2022, 3 pages.

(Continued)

*Primary Examiner* — Adam R Mott
*Assistant Examiner* — Heather J Keniry
(74) *Attorney, Agent, or Firm* — NIXON & VANDERHYE, P.C.

(57) ABSTRACT

A manipulator and a method for controlling the manipulator are disclosed. The manipulator includes: a plurality of links respectively corresponding to a user's upper arm, fore arm, and hand, a plurality of motors rotating the plurality of links, a communication interface comprising communication circuitry, a memory storing at least one instruction, and a processor configured to execute the at least one instruction, wherein the processor is configured to: based on first rotation angle information for motors corresponding to the upper arm and the fore arm among the plurality of motors, obtain information for a body frame of a link corresponding to the fore arm, obtain equilibrium angle information that positions the body frame in equilibrium with a specified reference (Continued)

frame, based on receiving a sensing value indicating the posture of the hand from an external sensor through the communication interface, obtain second rotation angle information for motors corresponding to the hand among the plurality of motors based on the sensing value and the equilibrium angle information, and control the motors corresponding to the hand based on the second rotation angle information.

15 Claims, 14 Drawing Sheets

(58) Field of Classification Search
CPC .......... G05B 2219/36184; G05B 2219/36442; G05B 2219/37388; G05B 2219/40391
See application file for complete search history.

(56) References Cited

U.S. PATENT DOCUMENTS

| | | | |
|---|---|---|---|
| 8,160,205 | B2 | 4/2012 | Henderson et al. |
| 8,660,695 | B2 | 2/2014 | De La Rosa Tames et al. |
| 9,221,172 | B2 | 12/2015 | Williamson et al. |
| 9,327,396 | B2 | 5/2016 | Kim |
| 10,500,726 | B2 | 12/2019 | Gildert |
| 10,518,409 | B2 | 12/2019 | Oleynik |
| 11,833,680 | B2 * | 12/2023 | Deits ............... B25J 9/1664 |
| 2015/0290795 | A1 | 10/2015 | Oleynik |
| 2019/0380791 | A1 | 12/2019 | Fuerst et al. |
| 2020/0055182 | A1 | 2/2020 | Ju |
| 2020/0189125 | A1 * | 6/2020 | Yamagishi ............ B25J 9/0006 |
| 2020/0297447 | A1 | 9/2020 | Soni et al. |
| 2021/0069894 | A1 | 3/2021 | Rod et al. |
| 2021/0162602 | A1 * | 6/2021 | Kawaguchi ............ B25J 11/00 |

FOREIGN PATENT DOCUMENTS

| | | |
|---|---|---|
| JP | H09109069 A | 4/1997 |
| JP | 2005136280 A | 5/2005 |
| JP | 2006107024 A | 4/2006 |
| JP | 2018153873 A | 10/2018 |
| JP | 2021-049633 | 4/2021 |
| KR | 20130094128 A | 8/2013 |
| KR | 101829128 B1 | 2/2018 |
| KR | 101995317 B1 | 7/2019 |
| KR | 10-2001214 | 10/2019 |
| KR | 102030141 B1 | 10/2019 |
| KR | 20200091238 A | 7/2020 |
| KR | 102237025 B1 | 4/2021 |

OTHER PUBLICATIONS

Written Opinion of the ISA for PCT/KR2022/009633 mailed Oct. 26, 2022, 4 pages.
Invitation under Rule 62a(1) EPC dated Sep. 4, 2024 issued in European Patent Application No. 22846089.5.
Liu et al., "Analytical Inverse Kinematics Solver for Anthropomorphic 7-DOF Redundant Manipulators with Human-Like Configuration Constraints", Dec. 27, 2016, 17 pages.
Supplementary European Search Report dated Jan. 14, 2025 issued in European Patent Application No. 22846089.5.

* cited by examiner

FIG. 1B
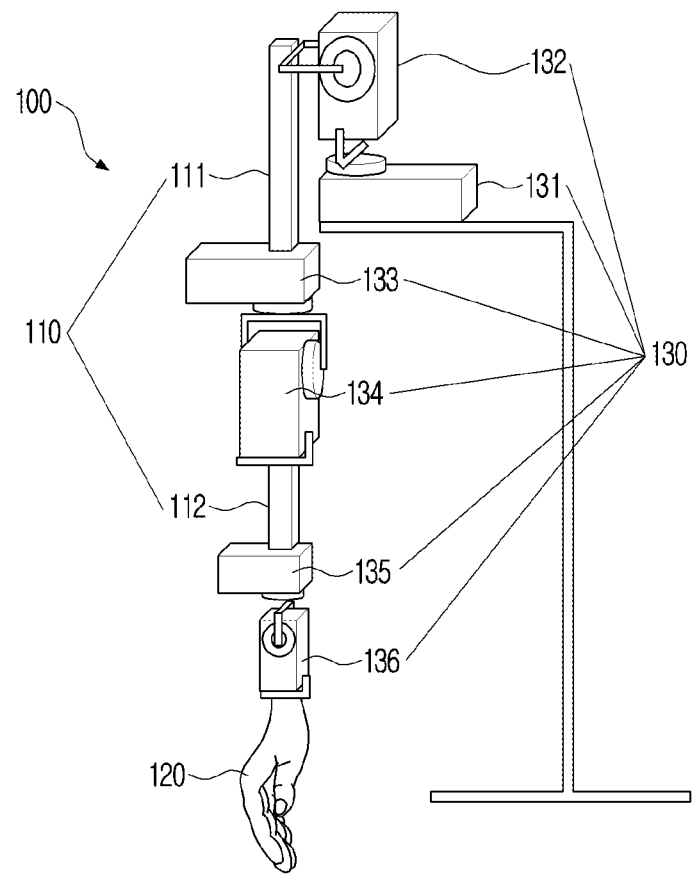
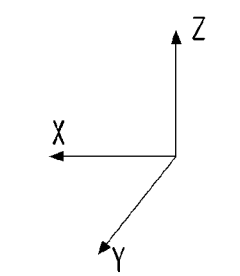
NAVIGATION FRAME
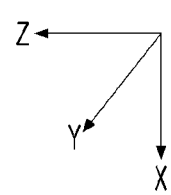
BODY FRAME
(FIRST LINK,
SECOND LINK, HAND)

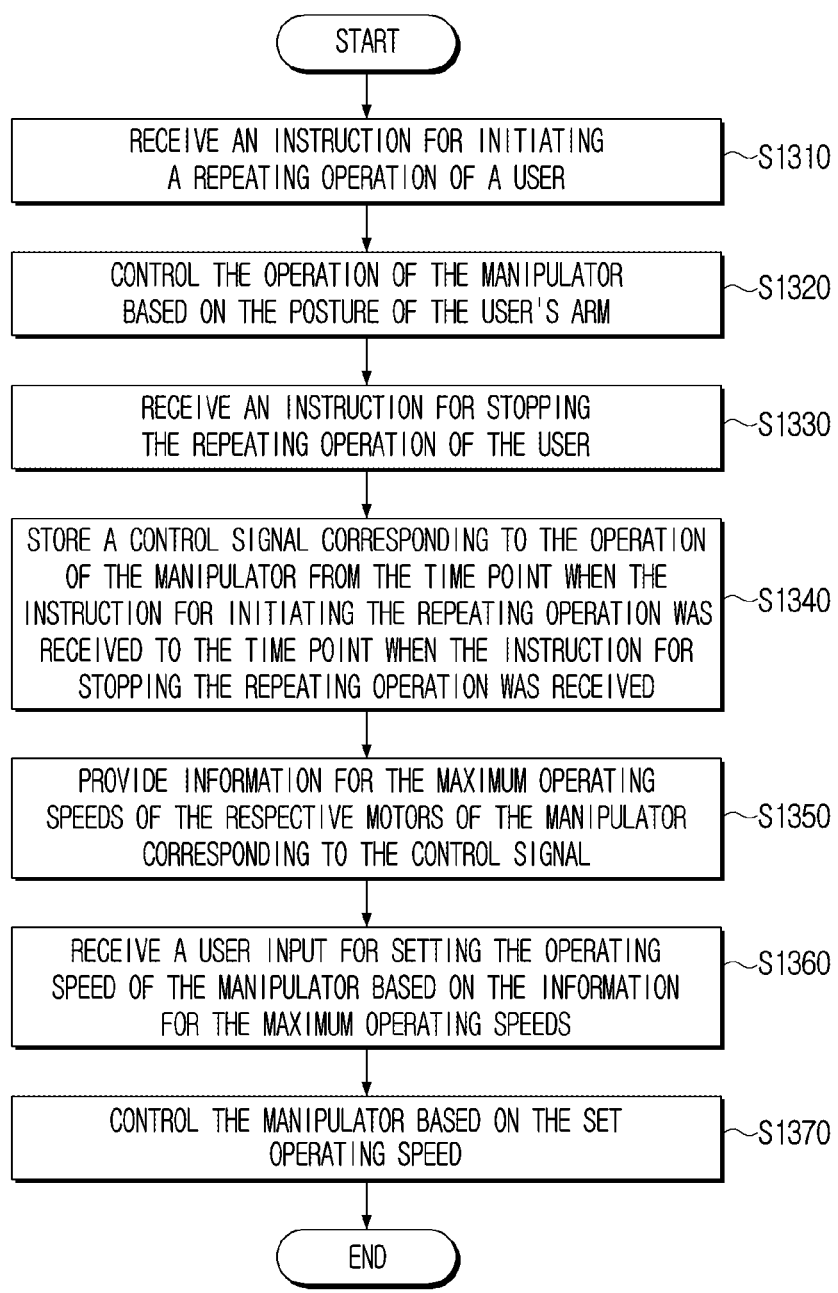

MANIPULATOR AND METHOD FOR CONTROLLING THEREOF

CROSS-REFERENCE TO RELATED APPLICATIONS

This application is a continuation of International Application No. PCT/KR2022/009633 designating the United States, filed on Jul. 5, 2022, in the Korean Intellectual Property Receiving Office and claiming priority to Korean Patent Application No. 10-2021-0095697, filed on Jul. 21, 2021, in the Korean Intellectual Property Office and Korean Patent Application No. 10-2022-0002833, filed on Jan. 7, 2022, in the Korean Intellectual Property Office, the disclosures of all of which are incorporated by reference herein in their entireties.

BACKGROUND

1. Field

The disclosure relates to a manipulator and a method for controlling thereof, and for example, to a manipulator that follows a movement of a user's arm, and a method for controlling thereof.

2. Description of Related Art

Recently, spurred by the development of robot technologies, various types of robots such as a cleaning robot, a service robot, an industrial robot, etc. are being used. Also, recently, research for a robot arm that follows a movement of a user's (e.g., a person's) arm, a manipulator, is proceeding actively.

In particular, if a manipulator can follow a movement of a user's arm quickly and intuitively, the manipulator can be utilized in various applied fields, such as doing shopping instead of the user, organizing goods in a shopping mall instead of the user, cooking in a home, or giving a massage, etc. Other than the above, a manipulator can be widely used in fields such as logistics, medical care, education, etc., and fields wherein non-face-to-face/non-contact are required depending on infectious diseases, etc.

A conventional manipulator determined a location and a posture of a user's arm using a visual sensor or a wireless signal. For this, in a conventional manipulator, a camera or an additional equipment having a function of a wireless signal transmitter/receiver had to be installed, and this directly led to the rise of the manufacturing cost of the manipulator. In a conventional manipulator, links were not mapped with links of a user's arm one to one, and thus the manipulator could not correctly follow the user's movement.

Accordingly, there is a rising need for a manipulator that can correctly follow a movement of a user's arm without a visual sensor.

According to the conventional technology, a user is made to wear a device similar to a joint structure of a manipulator, and thus a feeling of fatigue is given to the user when the user uses the device for a long time, or the user is made to feel inconvenience due to limitation on an action range. Also, as a location of a hand of a manipulator is controlled using only a location of a user's hand, limitation that identifying and controlling an actual movement of the manipulator on a screen remotely cannot be performed intuitively is being pointed out.

Accordingly, there is a need for a technology that can improve a user's convenience, and control a manipulator more intuitively and elaborately.

According to the conventional technology, a posture of a hand of a manipulator is assumed using quaternion information obtained from a sensor installed on a user's hand, and according to this, a posture error that occurs according to a movement of a user's arm may occur. This is because the degree of freedom (DOF) of a manipulator is less than the degree of freedom for a movement of a user's arm, and as points that are consecutively interpreted increase, and as the location proceeds more from a shoulder (a starting point) to a hand (an ending point), posture errors accumulatively increase.

Accordingly, there is a need for a technology that expresses an actual movement of a user's hand more correctly by minimizing/reducing posture errors that occur according to a movement of a user's arm.

SUMMARY

Embodiments of the disclosure address problems of the conventional technology, and embodiments of the disclosure provide a manipulator that can follow a movement of a user's arm elaborately, and a method for controlling the manipulator.

The technical aspects of the disclosure are not limited to the technical tasks mentioned above, and other technical tasks that were not mentioned would be clearly understood by those having ordinary skill in the technical field to which the disclosure belongs from the descriptions below.

According to an example embodiment of the disclosure, a manipulator includes: a plurality of links respectively corresponding to an upper arm, fore arm, and hand, a plurality of motors configured to rotate the plurality of links, a communication interface comprising communication circuitry, a memory storing at least one instruction, and a processor configured to execute the at least one instruction, wherein the processor is configured to: based on first rotation angle information for motors corresponding to the upper arm and the fore arm among the plurality of motors, obtain information for a body frame of a link corresponding to the fore arm; obtain equilibrium angle information that configured to position the body frame in equilibrium with a specified reference frame; based on receiving a sensing value indicating the posture of the hand from an external sensor through the communication interface; obtain second rotation angle information for motors corresponding to the hand among the plurality of motors based on the sensing value and the equilibrium angle information; and control the motors corresponding to the hand based on the second rotation angle information.

The processor may be configured to: calculate a frame conversion matrix for converting the first rotation angle information into a sensing value indicating the posture of the upper arm and the posture of the fore arm; and obtain information for the body frame corresponding to the fore arm based on the frame conversion matrix.

The equilibrium angle information may include roll equilibrium angle information and pitch equilibrium angle information, and the roll equilibrium angle information may indicate an angle that positions a second axis of the body frame parallel to an xy plane of the reference frame based on rotating around the body frame based on a first axis of the body frame.

The pitch equilibrium angle information may indicate an angle that positions a third axis of the body frame to coincide with a z axis of the reference frame based on rotating around the body frame based on the second axis of the body frame rotated based on the roll equilibrium angle information.

The processor may be configured to: obtain third rotation angle information for the motors corresponding to the hand based on the sensing value indicating the posture of the hand; and obtain the second rotation angle information by compensating the third rotation angle information based on the equilibrium angle information.

The plurality of links may include: a first link corresponding to the upper arm, a second link corresponding to the fore arm, and a third link corresponding to the hand, and the plurality of motors may include: a first motor configured to rotate the first link based on the first axis, a second motor configured to rotate the first link based on the second axis, a third motor configured to rotate the second link based on the first axis, a fourth motor configured to rotate the second link based on the third axis, a fifth motor configured to rotate the third link based on the first axis, and a sixth motor configured to rotate the third link based on the second axis.

The processor may, based on receiving an instruction for stopping an operation of a first user while the manipulator is operating, be configured to inactivate an external sensor for recognizing the posture of the first user's arm; and stop the operation of the manipulator, based on receiving an instruction for initiating an operation of a second user for controlling the manipulator, to control the communication interface to transmit information on a guide screen for compensating a difference between the posture of the manipulator and the posture of the second user's arm to the user terminal of the second user, and based on identifying that the difference between the posture of the manipulator and the posture of the second user's arm being within a specified threshold range, to control the plurality of motors based on the posture of the second user's arm.

The processor may, based on receiving an instruction for initiating a repeating operation of the user, be configured to control the plurality of motors based on the posture of the user's arm based on receiving an instruction for stopping the repeating operation of the user, to store a control signal corresponding to the operation of the manipulator from the time point the instruction for initiating the repeating operation was received to the time point the instruction for stopping the repeating operation was received in the memory, based on the control signal being stored, to control the communication interface to transmit information for the maximum operating speeds of the plurality of respective motors corresponding to the control signal to the user terminal of the user, and based on receiving a user input for setting the operating speed of the manipulator based on the information for the maximum operating speeds, to control the plurality of motors based on the set operating speed.

According to an example embodiment of the disclosure, a method for controlling a manipulator including a plurality of links respectively corresponding to an upper arm, fore arm, and hand, and a plurality of motors configured to rotate the plurality of links includes: based on first rotation angle information for motors corresponding to the upper arm and the fore arm among the plurality of motors, obtaining information for a body frame of a link corresponding to the fore arm; obtaining equilibrium angle information that positions the body frame in equilibrium with a specified reference frame; based on receiving a sensing value indicating the posture of the hand from an external sensor, obtaining second rotation angle information for motors corresponding to the hand among the plurality of motors based on the sensing value and the equilibrium angle information; and controlling the motors corresponding to the hand based on the second rotation angle information.

The obtaining information for the body frame may include: calculating a frame conversion matrix for converting the first rotation angle information into a sensing value indicating the posture of the upper arm and the posture of the fore arm; and obtaining information for the body frame corresponding to the fore arm based on the frame conversion matrix.

The equilibrium angle information may include roll equilibrium angle information and pitch equilibrium angle information, and the roll equilibrium angle information may indicate an angle that positions a second axis of the body frame parallel to an xy plane of the reference frame in the case of rotating around the body frame based on a first axis of the body frame.

The pitch equilibrium angle information may indicate an angle that positions a third axis of the body frame to coincide with a z axis of the reference frame based on rotating around the body frame based on the second axis of the body frame being rotated based on the roll equilibrium angle information.

The obtaining the second rotation angle information may include: the obtaining third rotation angle information for the motors corresponding to the hand based on the sensing value indicating the posture of the hand; and obtaining the second rotation angle information by compensating the third rotation angle information based on the equilibrium angle information.

The plurality of links may include a first link corresponding to the upper arm, a second link corresponding to the fore arm, and a third link corresponding to the hand, and the plurality of motors may include a first motor configured to rotate the first link based on the first axis, a second motor configured to rotate the first link based on the second axis, a third motor configured to rotate the second link based on the first axis, a fourth motor configured to rotate the second link based on the third axis, a fifth motor configured to rotate the third link based on the first axis, and a sixth motor configured to rotate the third link based on the second axis.

According to an example embodiment of the disclosure, a manipulator includes: a plurality of links including a first link and a second link, a plurality of motors configured to rotate the plurality of links, a communication interface including a circuit, a memory storing at least one instruction, and a processor, wherein the processor is configured to: receive a sensing value of an external sensor for detecting a posture of a user's arm through the communication interface, obtain a second vector corresponding to the posture of the user's arm based on a matrix obtained based on the sensing value and a first vector prestored in the memory, obtain posture information of the user's arm based on the second vector, and control the driving of the plurality of motors based on the posture information of the user's arm. The processor is further configured to: obtain a third vector corresponding to the first link based on a sensing value of a first external sensor, obtain a fourth vector corresponding to the second link based on a sensing value of a second external sensor, obtain posture information corresponding to the second link based on the third vector and the fourth vector, and control the driving of the plurality of motors corresponding to the second link based on the posture information corresponding to the second link.

The processor may be configured to obtain a quaternion vector corresponding to the posture of the user's arm by applying the sensing value to an Altitude and Heading Reference System (AHRS) algorithm stored in the memory, and obtain the matrix based on the quaternion vector.

The second vector may include a first second vector corresponding to the x axis and a second second vector corresponding to the z axis, and the posture information of the user's arm may include a roll angle corresponding to the x axis, a pitch angle corresponding to the y axis, and a yaw angle corresponding to the z axis, and the processor may obtain a first yaw angle based on the first second vector, obtain a second yaw angle based on the second second vector, and obtain the yaw angle based on the first yaw angle and the second yaw angle.

The processor may be configured to obtain the yaw angle by applying weights to the first yaw angle and the second yaw angle based on a predefined weight function.

The processor may be configured to: obtain a first matrix based on a first sensing value corresponding to an initial set posture of the user's arm and store the matrix in the memory, and obtain the matrix based on a second matrix obtained based on a second sensing value corresponding to the current posture of the user's arm and the first matrix.

The processor may be configured to: obtain an angle corresponding to the x axis based on the inner product of the third vector and the fourth vector, and obtain an angle corresponding to the z axis based on the cross product of the third vector and the fourth vector.

According to various example embodiments of the disclosure, a manipulator can follow a movement of a user's arm correctly. Accordingly, user convenience and satisfaction are improved. A manipulator can operate without a visual sensor, and thus the manufacturing cost of the manipulator can be reduced.

Other than the above, effects that can be obtained or predicted from the embodiments of the disclosure will be directly or implicitly described in the detailed description for the embodiments. For example, various effects according to the embodiments of the disclosure will be described in the detailed description that will be described below.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 1B is a diagram illustrating an example configuration of a manipulator according to various embodiments;

FIG. 13 is a flowchart illustrating an example method of controlling a repeating operation of a manipulator according to various embodiments.

DETAILED DESCRIPTION

Figure 1A:
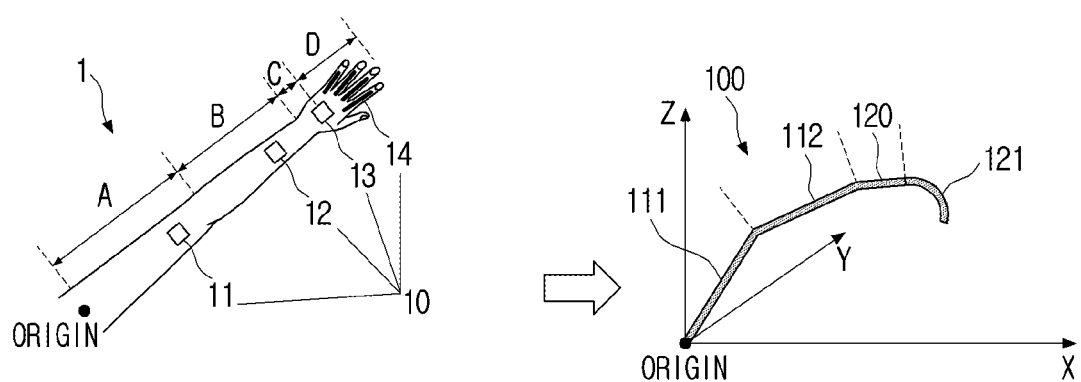
FIG. 1A is a diagram illustrating an example manipulator according to various embodiments.

Terms used in the disclosure will be described briefly, and the disclosure will be described in greater detail.

As terms used in the disclosure, general terms that are currently used widely were selected as far as possible, in consideration of the functions described in the disclosure. However, the terms may vary depending on the intention of those skilled in the art who work in the pertinent field, previous court decisions, or emergence of new technologies. In some cases, there may be terms that were arbitrarily selected, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Further, various modifications may be made to the various example embodiments of the disclosure, and there may be various embodiments. Accordingly, specific embodiments will be illustrated in drawings, and the embodiments will be described in detail in the detailed description. However, it should be noted that the various example embodiments are not intended to limit the scope of the disclosure to a specific embodiment, but they should be interpreted to include all modifications, equivalents, or alternatives of the embodiments included in the technical scope of the disclosure. In case it is determined that in describing embodiments, detailed explanation of related known technologies may unnecessarily confuse the gist of the disclosure, the detailed explanation will be omitted.

Terms such as "first," "second," and the like may be used to describe various elements, but the expressions are not intended to limit the elements. Such terms are used only to distinguish one element from another element.

Singular expressions include plural expressions, unless clearly different in context. Further, in the disclosure, terms such as "include" and "consist of" should be construed as designating that there are such characteristics, numbers, steps, operations, elements, components, or a combination thereof described in the disclosure, but not as excluding in advance the existence or possibility of adding one or more of other characteristics, numbers, steps, operations, elements, components, or a combination thereof.

Hereinafter, various example embodiments of the disclosure will be described in greater detail with reference to the accompanying drawings. However, it should be noted that the disclosure may be implemented in various different forms, and is not limited to the embodiments described herein. In the drawings, parts that are not related to explanation may be omitted, for explaining the disclosure clearly, and throughout the disclosure, similar components were designated by similar reference numerals.

FIG. 1A is a diagram illustrating an example manipulator according to various embodiments.

A manipulator 100 may follow a movement of a user's arm 1 based on a sensing value of an external sensor 10 for detecting a posture of the user's arm 1. The manipulator 100 may obtain posture information of the user's arm 1 based on the sensing value of the external sensor 10 (e.g., an IMU sensor, a geomagnetic sensor). The external sensor 10 may include a first external sensor 11 attached on the upper arm A of the user's arm 1, a second external sensor 12 attached on the fore arm B, a third external sensor 13 attached on the back of the hand C, and a flex sensor 14 attached on the finger D.

The manipulator 100 may include a first link 111 corresponding to the upper arm A of the user's arm 1, and a second link 112 corresponding to the fore arm B. Also, the manipulator 100 may include a hand 120 including a plurality of fingers 121. The manipulator 100 may operate based on the posture information of the user's arm 1. For example, the manipulator 100 may grip an object using the hand 120.

FIG. 1B is a diagram illustrating an example configuration of a manipulator according to various embodiments.

The manipulator 100 may include a link 110, a hand 120, and a motor 130. The link 110 may include a first link 111 and a second link 112. The motor 130 may include a first motor to a sixth motor 131, 132, 133, 134, 135, 136.

The first motor 131 and the second motor 132 may be connected with the first link 111, and rotate the first link 111. For example, the first motor 131 may rotate the first link 111 based on a first axis. The first axis may refer, for example, to the x axis of the body frame that will be described below. The second motor 132 may rotate the first link 111 based on a second axis. The second axis refer, for example, to the y axis of the body frame.

The third motor 133 and the fourth motor 134 may be connected with the first link 111 and the second link 112, and rotate the second link 112. For example, the third motor 133 may rotate the second link 112 based on the first axis. The fourth motor 134 may rotate the second link 112 based on a third axis. The third axis may refer, for example, to the z axis of the body frame.

The fifth motor 135 and the six motor 136 may be connected with the second link 112 and the hand 120, and rotate the hand 120. For example, the fifth motor 135 may rotate the hand 120 based on the first axis. The sixth motor 136 may rotate the hand 120 based on the second axis.

It should be noted that the number of the links 110 and the motors 130 according to FIG. 1B is merely an example, and the number of the links 110 and the motors 130 is not limited thereto.

Figure 2:
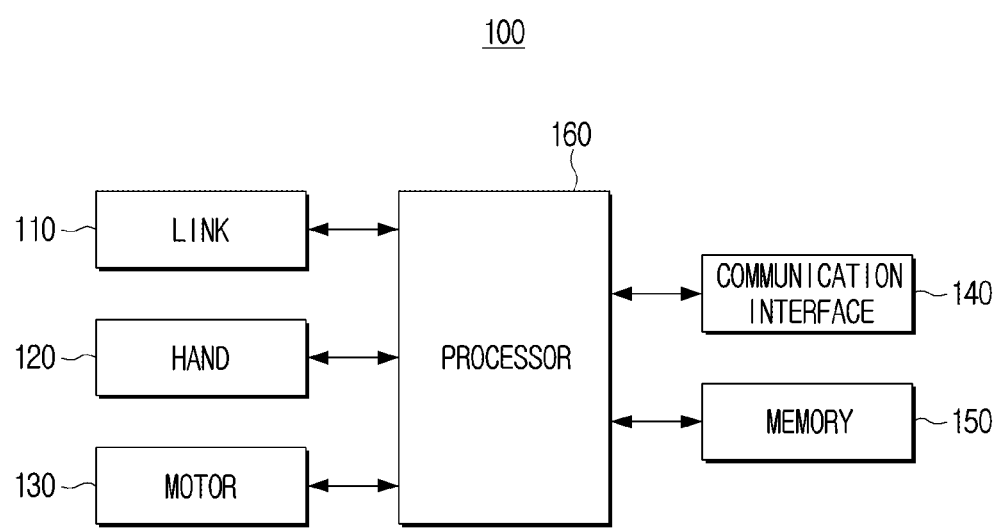
FIG. 2 is a block diagram illustrating an example configuration of a manipulator according to various embodiments.

FIG. 2 is a block diagram illustrating an example configuration of a manipulator according to various embodiments. The manipulator 100 may include a link 110, a hand 120, a motor 130, a communication interface (e.g., including communication circuitry) 140, a memory 150, and a processor (e.g., including processing circuitry) 160.

The link 110 may include a first link 111 corresponding to an upper arm of a user's (e.g., a person's) arm, and a second link 112 corresponding to a fore arm. The first link 111 and the second link 112 may be connected through the motor 130, and rotate along three axes according to the driving of the motor 130.

The hand 120 may include a plurality of fingers. The hand 120 may grip an object, or release the grip by moving each finger by control of the processor 160.

The motor 130 may include a plurality of motors 131, 132, 133, 134, 135, 136. The motor 130 may be driven under control of the processor 160, and move the link 110 and the hand 120.

The communication interface 140 may include at least one circuit, and perform communication with various types of external devices according to various types of communication methods. For example, the communication interface 140 may receive a sensing value of the external sensor 10 from the external sensor 10.

The external sensor 10 may refer to a component for detecting a movement or a posture of the user's arm 1, and it may include a plurality of Inertial Measurement Unit (IMU) sensors, a plurality of geomagnetic sensors, and a flex sensor. For example, referring to FIG. 1A, the first external sensor 11 including a first IMU sensor and a first geomagnetic sensor may be attached on the upper arm of the user's arm 1. The second external sensor 12 including a second IMU sensor and a second geomagnetic sensor may be attached on the fore arm of the user's arm 1. The third external sensor 13 including a third IMU sensor and a third geomagnetic sensor may be attached on the back of the hand of the user's arm 1. The flex sensor 14 may be attached on the user's finger. Each external sensor may detect the posture of the user's arm 1. In FIG. 1A, it was illustrated that the first external sensor 11, the second external sensor 12, the third external sensor 13, and the flex sensor 14 are respectively attached on the user's arm 1, but it is also possible that the user wears a wearable device including the first external sensor 11, the second external sensor 12, the third external sensor 13, and the flex sensor 14.

The communication interface 140 may include a wireless communication module and a wired communication module, each including various communication circuitry. The wireless communication module may include at least one of a Bluetooth Low Energy (BLE) module, a Wi-Fi communication module, a cellular communication module, a 3rd Generation (3G) mobile communication module, a 4th Generation (4G) mobile communication module, a 4th Generation Long Term Evolution (LTE) communication module, or a 5th Generation (5G) mobile communication module. The wired communication module may include an Ethernet module. Also, the communication interface 140 may include at least one communication terminal.

The memory 150 may store an operating system (OS) for controlling the overall operations of the components of the manipulator 100, and instructions or data related to the components of the manipulator 100. For example, the memory 150 may store data regarding an Altitude and Heading Reference System (AHRS) algorithm for obtaining quaternion information based on a sensing value of the external sensor 10. The memory 150 may be implemented as a non-volatile memory (ex: a hard disc, a solid state drive (SSD), a flash memory), a volatile memory, etc.

The processor 160 may be electronically connected with the memory 150, may include various processing circuitry and control the overall functions and operations of the manipulator 100. For example, the processor 160 may control the driving of the motor 130 rotating the link 110 and the hand 120.

Hereinafter, an operation of the processor 160 for controlling the driving of the first motor 131 and the second motor 132 rotating the first link 111 corresponding to the upper arm of the user's arm 1 will be described. For describing the operation, the body frame and the navigation frame defined in the first link 111, the second link 112, and the hand 120 of the manipulator 100 will be described.

The body frame may be a frame that is changed according to a movement of the manipulator 100. Referring to FIG. 1B, the first link 111, the second link 112, and the hand 120 of the manipulator 100 may be aligned in a lower direction, e.g., the direction of gravity. The x axis of the body frame may refer, for example, to the direction of the first link 111, and the z axis may refer, for example, to the direction of the first link 111 when the manipulator 100 is moved to be perpendicular to the direction of gravity by the second motor 132. The y axis of the body frame may refer, for example, to the direction of the thumb when the right hand is clenched from the z axis in the direction of the x axis (the right hand frame). In the disclosure, the x axis of the body frame may also be referred to as the first axis, the y axis may be referred to as the second axis, and the z axis may be referred to as the third axis.

The navigation frame may refer, for example, to a frame fixed regardless of the movement of the manipulator 100. A frame conversion matrix between the navigation frame and the body frame may be obtained based on quaternion information or a Euler's angle.

The processor 160 may obtain quaternion information based on a sensing value of the external sensor. The quaternion information indicates information regarding rotation of a user's arm, and it may include a rotation vector and a rotation angle. The processor 160 may obtain the quaternion information by applying a sensing value of the external sensor to the AHRS algorithm stored in the memory 150. For example, the quaternion information may be a vector q as in the [Formula 1].

$$q = [q0 \ q1 \ q2 \ q3]^\tau \quad \text{[Formula 1]}$$

In control of a robot arm wherein a rotation axis is physically fixed, there is a need that quaternion information is converted into a Euler's angle. Accordingly, in the conventional technology for controlling a robot arm, quaternion information was converted into an Euler's angle as in the [Formula 2].

$$\begin{bmatrix} \phi \\ \theta \\ \psi \end{bmatrix} = \begin{bmatrix} \arctan \frac{2(q_0 q_1 + q_2 q_3)}{1 - 2(q_1^2 + q_2^2)} \\ \arcsin(2(q_0 q_2 - q_3 q_1)) \\ \arctan \frac{2(q_0 q_3 + q_1 q_2)}{1 - 2(q_2^2 + q_3^2)} \end{bmatrix} \quad \text{[Formula 2]}$$

However, according to the [Formula 2], as the pitch angle θ approaches more to +90 degrees or −90 degrees, the numerators and the denominators of the roll angle Ø and the yaw angle φ converge to 0, and thus a problem that it becomes difficult to assume the roll angle Ø and the yaw angle φ occurs. This may be referred to as a so-called Gimbal lock problem.

To address such a Gimbal lock problem, the processor 160 according to the disclosure may obtain vectors for each axis of the body frame interpreted in the navigation frame using the matrix obtained based on the quaternion information. For example, the processor 160 may obtain a frame conversion matrix $C_b^n$ from the body frame to the navigation frame from the quaternion information based on the following [Formula 3]. The frame conversion matrix may refer, for example, to a matrix for converting the first vector based on the manipulator 100 into the second vector of the reference frame.

$$C_b^a = \begin{bmatrix} q_0^2 + q_1^2 - q_2^2 - q_3^2 & 2q_1 q_2 - 2q_0 q_3 & 2q_0 q_2 + 2q_1 q_3 \\ 2q_0 q_3 + 2q_1 q_2 & q_0^2 - q_1^2 + q_2^2 - q_3^2 & 2q_2 q_3 - 2q_0 q_1 \\ 2q_1 q_3 - 2q_0 q_2 & 2q_2 q_3 + 2q_0 q_1 & q_0^2 - q_1^2 - q_2^2 + q_3^2 \end{bmatrix} \quad \text{[Formula 3]}$$

Figure 3:
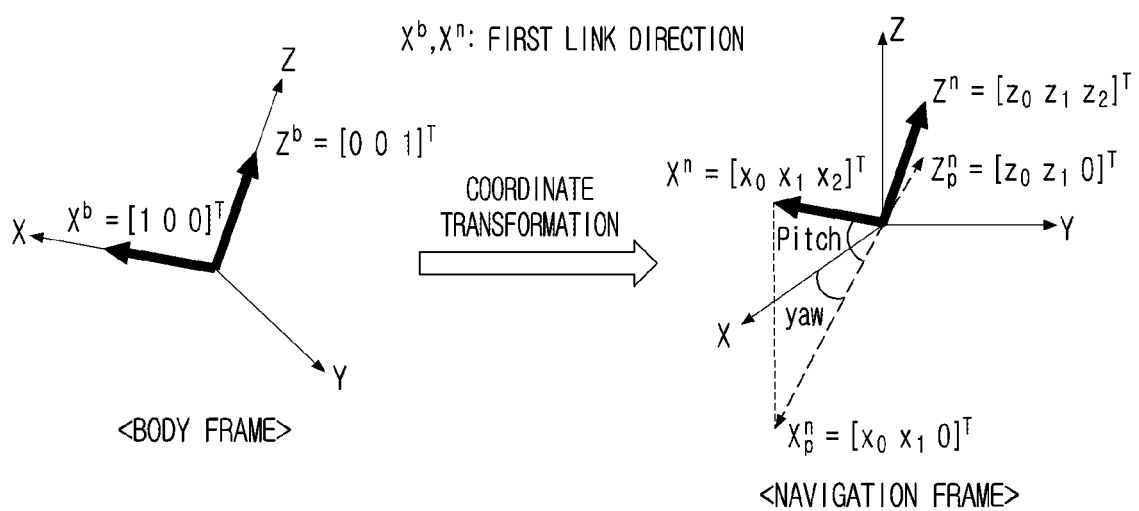
FIG. 3 is a diagram illustrating frame conversion of a vector according to various embodiments.

FIG. 3 is a diagram illustrating an example frame conversion of a vector according to various embodiments.

Referring to FIG. 3, the first vector $X^b, Z^b$ based on the manipulator 100 may respectively be a unit vector $[1,0,0]^T$ in the direction of the x axis and a unit vector $[0,0,1]^T$ in the direction of the z axis expressed in the body frame. The first vector $X^b, Z^b$ may be stored in the memory 150 as a preset value.

The processor 160 may obtain a second vector $X^n, Z^n$ based on the frame conversion matrix $C_b^n$ from the body frame to the navigation frame, and the first vector $X^b, Z^b$.

For example, the processor 160 may obtain the second vector expressed in the navigation frame based on the [Formula 4]. The second vector $X^n, Z^n$ may include a 2-1 vector $X^n$ and a 2-2 vector $Z^n$. Meanwhile, the upper subscripts b and n of the vectors in the disclosure may respectively refer to location vectors interpreted in the body frame and the navigation frame.

$$X^n = C_b^n X^b = [x_0 \ x_1 \ x_2]^\tau Z^n = C_b^n Z^b = [z_0 \ z_1 \ z_2]^\tau \quad \text{[Formula 4]}$$

The processor 160 may obtain posture information of the user's arm based on the second vector $X^n, Z^n$. The posture information of the user's arm may include a roll angle corresponding to the X axis, a pitch angle corresponding to the y axis, and a yaw angle corresponding to the z axis. In the disclosure, the roll angle of the first link 111 was ignored. Changes of postures of the second link 112 and the hand 120 by the roll rotation angle of the first link 111 may be expressed as a third motor 133. Based on the navigation frame, all location vectors of the first link 111 may respectively be expressed as a yaw angle and a pitch angle by the first motor 131 and the second motor 132.

The processor 160 may obtain a pitch angle, a first yaw angle yaw1, and a second yaw angle yaw2 based on the [Formula 5].

$$\text{Pitch} = -\tan^{-1} \frac{x_2}{\sqrt{x_0^2 + x_1^2}}$$

$$\text{yaw1} = \tan^{-1} \frac{x_1}{x_0}$$

$$\text{yaw2} = \tan^{-1} \frac{z_1}{z_0} + \pi \quad \text{[Formula 5]}$$

The processor 160 may obtain the pitch angle and the first yaw angle yaw 1 based on the 2-1 vector $X^n$ or a vector $X_p^n$ wherein the 2-1 vector $X^n$ was made to be orthogonal on the xy plane. Also, the processor 160 may obtain the second yaw angle yaw2 based on the 2-2 vector $Z^n$ or a vector $Z_p^n$ wherein the 2-2 vector was made to be orthogonal on the xy plane.

The processor 160 may obtain the final yaw angle $\text{yaw}_{final}$ based on the first yaw angle yaw1, the second yaw angle yaw2, and a predefined weight function W. For example, the processor 160 may obtain the final yaw angle $\text{yaw}_{final}$ based on the [Formula 6].

$$\text{yaw}_{final} = W*\text{yaw1} + (1-W)*\text{yaw2} \qquad \text{[Formula 6]}$$

$W$ : weight function if $-\pi/2 \le \text{pitch} \le 0$ $$W = \frac{\left(\frac{\tan^{-1}\left(\frac{\left(\text{pitch}+\frac{\pi}{4}\right)}{T}\right)}{\pi}*2+1\right)}{2}, T=2$$

if $0 < \text{pitch} \le \pi/2$ $$W = \frac{\left(\frac{\tan^{-1}\left(\frac{\left(\text{pitch}+\frac{\pi}{4}\right)}{T}\right)}{\pi}*2+1\right)}{2}, T=2$$

Figure 4:
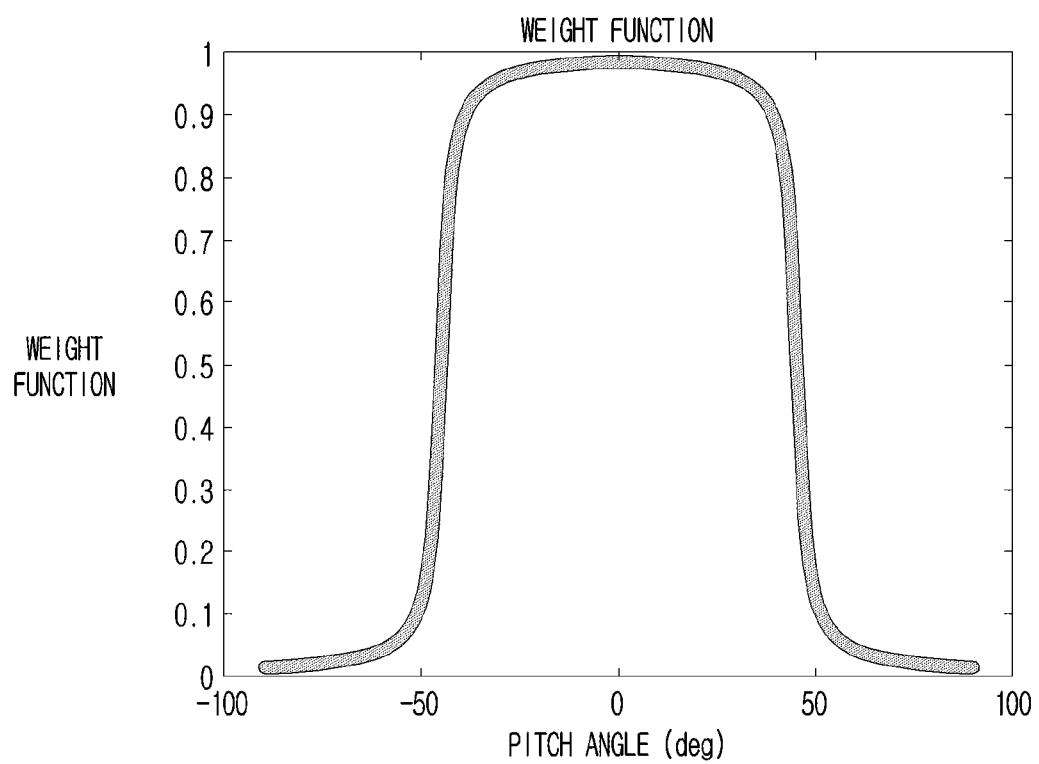
FIG. 4 is a graph of a weight function according to various embodiments.

The processor 160 may obtain the final yaw angle yaw$_{first}$ by applying weights based on the weight function W to the first yaw angle yaw1 and the second yaw angle yaw2. For example, the weight function W may be described as illustrated in FIG. 4.

The processor 160 may control the first motor 131 based on the final yaw angle yaw$_{final}$. The processor 160 may control the driving of the second motor 132 based on the obtained pitch angle. Accordingly, the manipulator 100 may follow the movement of the upper arm of the user's arm 1.

A method for controlling the driving of the first motor 131 and the second motor 132 rotating the first link 111 corresponding to the upper arm of the user's arm 1 has been described. Hereinafter, an operation of the processor 160 for controlling the driving of the third motor 133 and the fourth motor 134 rotating the second link 112 corresponding to the fore arm of the user's arm 1 will be described in greater detail.

Figure 5:
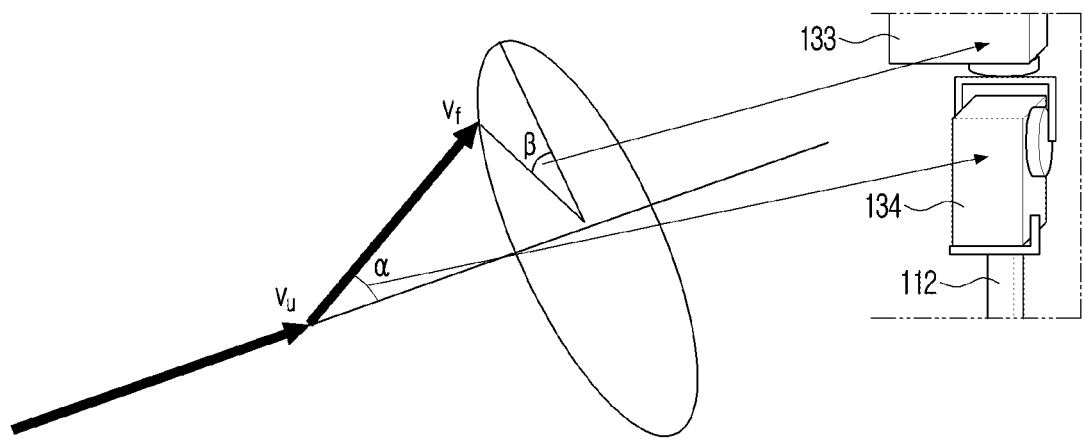
FIG. 5 is a diagram illustrating an example method for controlling driving of a motor according to various embodiments.

FIG. 5 is a diagram illustrating an example method for controlling driving of a motor according to various embodiments.

Referring to FIG. 5, a 2-1-1 vector $v_u$ corresponding to the direction of the first link 111, and a 2-2-2 vector $v_f$ corresponding to the direction of the second link 112 can be defined. The first angle $\alpha$ may refer, for example, to an angle between the third vector $v_u$ and the fourth vector $v_f$ indicating the directions of the first link 111 and the second link 112.

The following two vectors are defined for calculating the second angle $\beta$. First, a fifth vector $v_1$ wherein the fourth vector $v_f$ was made to be orthogonal in the direction of the third vector $v_u$ is defined. A circle of which center is the fifth vector $v_1$, and of which radius is the distance between the fourth vector $v_f$ and the fifth vector $v_1$ may exist on a plane perpendicular to the fifth vector $v_1$. Here, a sixth vector $v_x$ is defined from an intersection vector of the plane of the circle and the plane including the z axis vector and the fifth vector $v_1$ in the navigation frame. The second angle $\beta$ may refer, for example, to an angle between the fifth vector $v_1$ and the sixth vector $v_x$.

The processor 160 may control the driving of the fourth motor 134 based on the first angle $\alpha$, and control the driving of the third motor 133 based on the second angle $\beta$.

Hereinafter, an operation of the processor 160 for calculating the first angle $\alpha$ and the second angle $\beta$ will be examined.

The processor 160 may obtain the third vector $v_u$ and the fourth vector $v_f$. As the third vector $v_u$ is identical to the 2-1 vector in FIG. 3, detailed explanation thereof will be omitted. Also, the fourth vector $v_f$ may be obtained by the same method for the 2-1 vector $X^n$. For example, the processor 160 may obtain a sensing value of a second external sensor 12 attached on the fore arm of the user's arm 1. The processor 160 may obtain quaternion information corresponding to the sensing value of the second external sensor 12 using the AHRS algorithm. The processor 160 may obtain a frame conversion matrix corresponding to the sensing value of the second external sensor 12 based on the [Formula 3]. The processor 160 may obtain the fourth vector $v_f$ based on the [Formula 4].

The processor 160 may obtain the first angle $\alpha$ of the second link 112 based on the inner product of the third vector $v_u$ and the fourth vector $v_f$. Specifically, the processor 160 may obtain the first angle $\alpha$ based on the [Formula 7].

$$\alpha = \cos^{-1}\left(\frac{\langle v_u, v_f \rangle}{|v_u||v_f|}\right) \qquad \text{[Formula 7]}$$

$\langle v_u, v_f \rangle$: inner product of $v_u$, $v_f$

Figure 6:
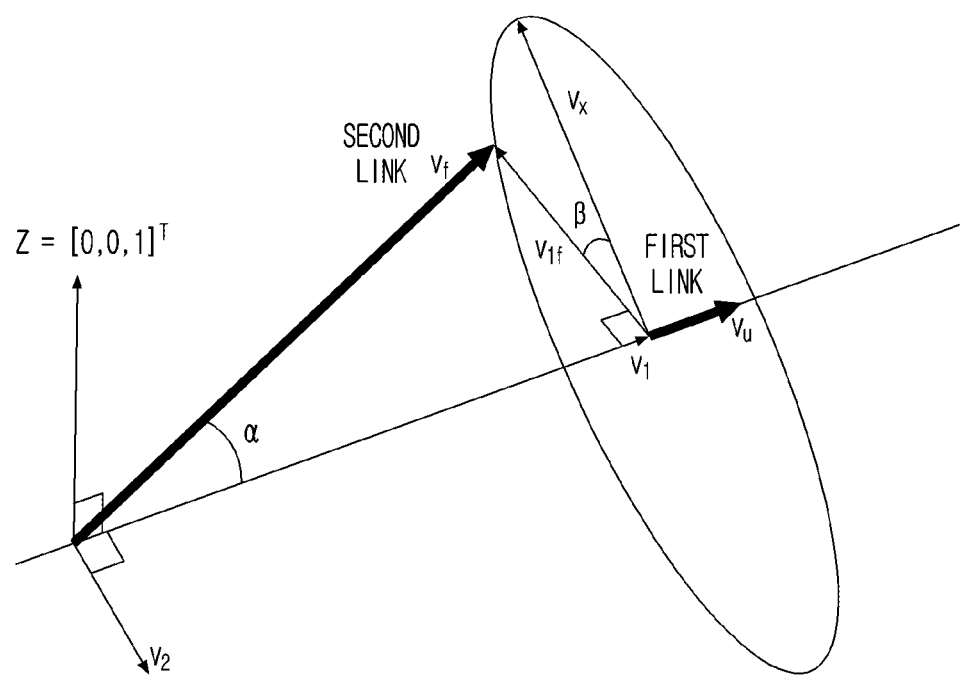
FIG. 6 is a diagram illustrating an example method for obtaining a second angle according to various embodiments.

FIG. 6 is a diagram illustrating an example method for obtaining a second angle according to various embodiments.

The processor 160 may obtain the second angle $\beta$ based on the [Formula 8] and the [Formula 9].

$$\beta = \cos^{-1}\left(\frac{\langle v_{1f}, v_x \rangle}{|v_{1f}||v_x|}\right) \qquad \text{[Formula 8]}$$

if $\cos^{-1}\left(\frac{\langle v_x \times v_{1f}, v_u \rangle}{|v_x \times v_{1f}||v_u|}\right) < \pi/2$ $\rightarrow \beta = (-1.0) = \beta$ $$v_1 = |v_f|\cos(\alpha)\frac{v_u}{|v_u|} \qquad \text{[Formula 9]}$$

$v_{1f} = v_f - v_1$ $v_2 = v_1 \times z$ $v_x = \frac{v_2 \times v_1}{|v_2 \times v_1|}|v_{1f}|$ The [Formula 8] and the [Formula 9] can be derived by the geometric relation illustrated in FIG. 6.

The posture of the back of the hand of the user's arm 1 is influenced by the postures of the upper arm and the fore arm of the user's arm 1, and the posture of the fore arm of the user's arm 1 is influenced by the posture of the upper arm of the user's arm 1. Accordingly, the posture of the back of the hand $C_{b,hand\_modified}^n$ independent from the postures of the upper arm and the fore arm of the user's arm 1 can be obtained by compensating the posture of the fore arm $C_{b,fore\_arm}^n$ to which the posture of the upper arm of the user's arm 1 is reflected as in the [Formula 9-2].

$$C_{b,hand\_modified}^n = C_{b,fore\_arm}^{n})^{-1}C_{d,hand}^n \qquad \text{[Formula 9-2]}$$

In FIG. 1B, if the rotation angles of the fifth motor 135 and the sixth motor 136 for expressing the roll and the pitch of the back of the hand are indicated as roll$_{hand}$ and pitch$_{hand}$, the two rotation angles are expressed as the [Formula 9-3].

$$\text{roll}_{hand} = \tan^{-1}\left(\frac{C^n_{b,hand\_modified}(3,2)}{C^n_{b,hand\_modified}(3,3)}\right) \quad \text{[Formula 9-3]}$$

$$\text{pitch}_{hand} = \sin^{-1}(-C^n_{b,hand,modified}(3,1))$$

A sensing value of the external sensor 10 attached on the user's arm 1 may include an error as physical characteristics (e.g., muscle mass, skin flexion, etc.) are different for each user. The processor 160 may compensate an error using an initial frame conversion matrix $C_{b,initial\_value}{}^n$ corresponding to an initial set posture of a user (e.g., an action of stretching an arm horizontally to the ground surface). For example, the processor 160 may obtain a frame conversion matrix wherein an error was compensated $C_{b,compensation}{}^n$ based on the [Formula 10]. Then, the processor 160 may use the frame conversion matrix wherein an error was compensated $C_{b,compensation}{}^n$ when obtaining the aforementioned second vector $X^n$, $Z^n$, third vector $v_u$, and fourth vector $v_f$.

$$C_{b,compensation}{}^n = (C_{b,initial\_value}{}^n)^{-1} C_{b,current\_value}{}^n \quad \text{[Formula 10]}$$

Here. $C_{b,current\_value}{}^n$ may refer, for example, to a frame conversion matrix that is obtained based on the current sensing value of the external sensor 10. The processor 160 may obtain the initial frame conversion matrix $C_{b,initial\_value}{}^n$ based on the sensing value of the external sensor 10 obtained when the user takes the initial set posture, and the [Formula 3], and store it in the memory 150.

The processor 160 may apply an IIR filter to motor control information for motion smoothing of the manipulator 100. The processor 160 may adjust the size of a control input applied to the motor 130 based on the [Formula 11].

$$\text{IIR}_{Motor_{input,t}} = k \cdot \text{IIR}_{Motor_{input,t-1}} + (1-k)M_t \text{ if } M > TH \to M = TH \quad \text{[Formula 11]}$$

Here, $\text{IIR}_{Motor_{input,t}}$ may refer, for example, to an output value of the filter used as an input of the motor 130, $\text{IIR}_{Motor_{input,t-1}}$ may refer, for example, to a control input of the motor right before the current time point, and M may refer, for example, to a control input of the motor assumed at the current time point before being filtered by the IIR filter. Also, TH may refer to a predetermined (e.g., specified) value (e.g., 10 degrees) for limiting the input of the motor 130, and k may refer, for example, to a predefined value (e.g., 0.7).

The processor 160 may control the driving of the fifth motor 135 and the sixth motor 136 for controlling the movement of the hand 120. For example, the processor 160 may obtain the posture information of the user's hand based on a sensing value of the third external sensor 13 attached on the wrist of the user's arm 1. The processor 160 may control the driving of the fifth motor 135 and the sixth motor 136 based on the obtained posture information.

The processor 160 may control the operation of the finger included in the hand 120. The processor 160 may obtain the posture information of the user's finger based on a sensing value of the flex sensor 14 received through the communication interface 140. The processor 160 may control the operation of the finger based on the obtained posture information. Meanwhile, the sensing value of the flex sensor 14 may include an error due to differences in hand shapes or sizes of users. The processor 160 may obtain a sensing value wherein an error was compensated Flex$_{cal}$ based on the [Formula 12], and control the operation of the finger based on the compensated sensing valueFlex$_{cal}$.

$$\text{Flex}_{cal} = \left(\frac{\text{Flex}_{current} - \text{Flex}_{min}}{\text{Flex}_{max} - \text{Flex}_{min}}\right) \quad \text{[Formula 12]}$$

Here, Flex$_{current}$ may refer, for example, to the sensing value of the flex sensor 14 obtained at the current time point, Flex$_{min}$ may refer, for example, to the minimum value among the sensing values of the flex sensor 14 stored in the memory 150, and Flex$_{max}$ may refer, for example, to the maximum value among the sensing values of the flex sensor 14 stored in the memory 150.

The processor 160 may accumulatively store the sensing values of the flex sensor 14 in the memory 150. For example, the processor 160 may accumulatively store the sensing values of the flex sensor 14 corresponding to an initial set posture of a user (e.g., a posture of clenching the first or a posture of unfolding the palm) in the memory 150. The processor 160 may identify the minimum value and the maximum value among the stored sensing values of the flex sensor 14.

Figure 7:
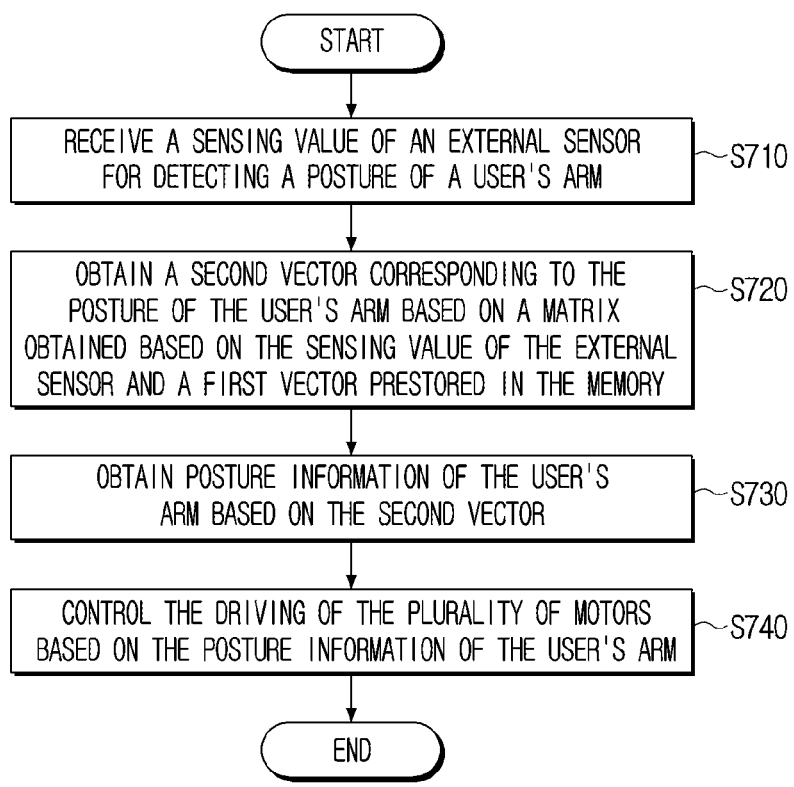
FIG. 7 is a flowchart illustrating an example method for controlling a manipulator according to various embodiments.

FIG. 7 is a flowchart illustrating an example method for controlling a manipulator according to various embodiments.

Referring to FIG. 7, the manipulator 100 may receive a sensing value of an external sensor for detecting a posture of a user's arm in operation S710. The external sensor may include a first external sensor attached on the upper arm of the user's arm, a second external sensor attached on the fore arm, a third external sensor attached on the wrist, and a flex sensor attached on the finger.

The manipulator 100 may acquire (e.g., obtain) a second vector corresponding to the posture of the user's arm based on a matrix obtained based on the sensing value of the external sensor and the first vector prestored in the memory in operation S720. The manipulator 100 may acquire information regarding a posture of a user's arm based on the second vector in in operation S730. For example, the manipulator 100 may apply the sensing value to an Altitude and Heading Reference System (AHRS) algorithm stored in the manipulator 100, and obtain a quaternion vector corresponding to the posture of the user's arm. The manipulator 100 may obtain a matrix based on the quaternion vector (quaternion information). For example, the manipulator 100 may obtain the matrix based on the [Formula 3].

The obtained matrix may include a value wherein an error according to differences in physical characteristic for each user was compensated. For example, the manipulator 100 may obtain a first matrix based on a first sensing value corresponding to the initial set posture of the user's arm, and store it in the manipulator 100. The manipulator 100 may obtain a compensated matrix based on a second matrix obtained based on a second sensing value corresponding to the current posture of the user's arm, and the stored first matrix.

The second vector may include a 2-1 vector corresponding to the x axis and a 2-2 vector corresponding to the z axis. The posture information of the user's arm may include a roll angle corresponding to the x axis, a pitch angle corresponding to the y axis, and a yaw angle corresponding to the z axis. The manipulator 100 may obtain a first yaw angle based on the 2-1 vector. The manipulator 100 may obtain a second yaw angle based on the 2-2 vector. The manipulator 100 may obtain the yaw angle by applying weights to the first yaw angle and the second yaw angle based on a predetermined weight function. The manipulator 100 may obtain the yaw angle based on the aforementioned [Formula 5] and [Formula 6].

The manipulator 100 may obtain the posture information of the fore arm of the user's arm, and control the movement of the second link 112 based on the posture information of the fore arm of the user's arm. The manipulator 100 may obtain a third vector corresponding to the first link 111 based on a sensing value of the first external sensor attached on the upper arm of the user's arm. The manipulator 100 may obtain a fourth vector corresponding to the second link 112 based on a sensing value of the second external sensor attached on the fore arm of the user's arm.

The manipulator 100 may obtain posture information corresponding to the second link 112 based on the third vector and the fourth vector. For example, the manipulator 100 may obtain the posture information corresponding to the second link 112 based on the aforementioned [Formula 7], [Formula 8], and [Formula 9]. The manipulator 100 may control the driving of the plurality of motors corresponding to the second link 112 based on the posture information corresponding to the second link 112 in operation S740.

A method for obtaining input values of motors corresponding to an upper arm and a fore arm of a manipulator from quaternion information corresponding to an upper arm and a fore arm of a user was described. Hereinafter, according to another embodiment of the disclosure, a method for assuming a posture of a hand independent from postures of an upper arm and a fore arm of a manipulator will be described.

Figure 8:
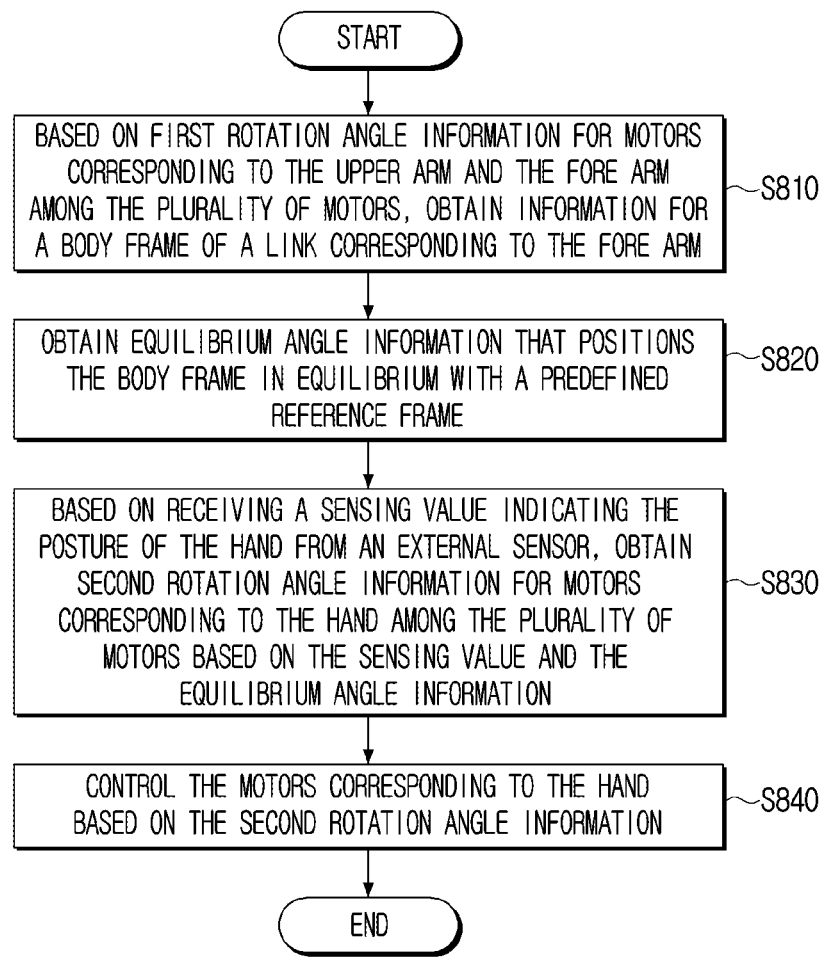
FIG. 8 is a flowchart illustrating an example method for controlling a manipulator according to various embodiments.

FIG. 8 is a flowchart illustrating an example method for controlling a manipulator according to various embodiments.

All of the quaternion information assumed from a user's upper arm, fore arm, or hand indicates an independent posture of a body frame based on the reference frame. This may refer, for example, to a Euler's angle being calculated from quaternion information assumed for each of the parts, the posture of the body frame can be made to coincide with the posture of the reference frame through frame conversion.

If a posture of a hand of a manipulator is independent from the postures of the upper arm and the fore arm of the manipulator as in the case of a posture of an actual hand of a user, the posture of the hand of the manipulator can be determined only with quaternion information assumed from the user's hand, and this may refer, for example, to the posture of the hand of the manipulator being easily carried out.

However, the posture of the hand of the manipulator changes according to the posture of the fore arm of the manipulator, and the posture of the fore arm of the manipulator changes according to the posture of the upper arm of the manipulator. That is, it can be said that the posture of the hand of the manipulator is dependent on the postures of the upper arm and the fore arm of the manipulator. Accordingly, for controlling the posture of the hand of the manipulator correctly, the posture of the upper arm and the posture of the fore arm of the manipulator should be considered.

Accordingly, the manipulator according to the disclosure can assume a posture of a hand independent from the postures of the upper arm and the fore arm of the manipulator, and this process may be referred to as a hand balancing process. Hereinafter, an embodiment related to a hand balancing process according to the disclosure will be described.

The embodiment that will be described below is also based on the premise that the manipulator according to the disclosure includes components as illustrated in FIG. 1B, as in the embodiment described earlier. Specifically, the manipulator may include a plurality of links, a plurality of motors, a communication interface, a memory, and a processor.

The plurality of links may include a first link corresponding to the upper arm, a second link corresponding to the fore arm, and a third link corresponding to the hand, and the plurality of motors may include a first motor rotating the first link based on the first axis, a second motor rotating the first link based on the second axis, a third motor rotating the second link based on the first axis, a fourth motor rotating the second link based on the third axis, a fifth motor rotating the third link based on the first axis, and a sixth motor rotating the third link based on the second axis.

As detailed explanation for the other components of the manipulator was described above, overlapping explanation for the same content may not be repeated here.

Referring to FIG. 8, the manipulator may obtain information for a body frame of a link corresponding to the fore arm based on first rotation angle information for motors corresponding to the upper arm and the fore arm among the plurality of motors in operation S810.

For example, the manipulator may calculate a frame conversion matrix for converting the first rotation angle information into a sensing value indicating the posture of the upper arm and the posture of the fore arm, and obtain information for the body frame corresponding to the fore arm based on the frame conversion matrix.

In other words, the manipulator may not use quaternion information corresponding to the upper arm and the fore arm, but calculate a frame conversion matrix inversely based on the first rotation angle information which is an actual motor input value for the motors corresponding to the upper arm and the fore arm, and obtain information for the body frame indicating the posture of the actual link corresponding to the fore arm based on it. This is for reducing errors that occur as the dimension of posture information of a high dimension expressed in the user's arm is reduced to a posture of a low dimension expressed in the link corresponding to the manipulator's arm.

When the information for the body frame of the link corresponding to the fore arm is obtained, the manipulator may obtain equilibrium angle information positioning the body frame in equilibrium with a predefined (e.g., specified) reference frame in operation S820.

The equilibrium angle information may include roll equilibrium angle information and pitch equilibrium angle information. The roll equilibrium angle information may indicate an angle that positions the second axis of the body frame in equilibrium with the xy plane of the reference frame in the case of rotating the body frame based on the first axis of the body frame, and the pitch equilibrium angle information may indicate an angle that makes the third axis of the body frame coincide with the z axis of the reference frame in the case of rotating the body frame based on the second axis of the body frame rotated according to the roll equilibrium angle information. The first axis, the second axis, and the third axis of the body frame are used as terms for specifying the x axis, the y axis, and the z axis of the body frame by distinguishing them from the x axis, the y axis, and the z axis of the reference frame.

For example, based on the posture information of the fore arm body frame expressed based on the reference frame, the manipulator may calculate a roll equilibrium angle that makes the second axis included within the xy plane of the reference frame in the case of rotating the fore arm body frame based on the first axis of the body frame.

When the roll equilibrium angle is calculated, the manipulator may calculate a pitch equilibrium angle that makes the third axis coincide with the z axis of the reference frame in the case of rotating the fore arm body frame based on the second axis, based on the posture information of the fore arm body frame that was newly made when rotating the fore arm body frame as much as the roll equilibrium angle based on the first axis.

After the pitch equilibrium angle was calculated, if the manipulator is rotated as much as the pitch equilibrium angle based on the second axis of the fore arm body frame of the manipulator, the plane including the first axis and the second axis of the fore arm body frame becomes perpendicular to the earth gravity acceleration vector, and hand balancing may be completed by this. This may refer, for example, to an independent posture of a hand being obtained no matter what kind of values the rotation angles of the motors driving the upper arm and the fore arm of the manipulator have.

The process of calculating a roll equilibrium angle and a pitch equilibrium angle will be described in greater detail below with reference to FIGS. 8, 9 and FIG. 10.

After the equilibrium angle information is obtained, if a sensing value indicating the posture of the hand is received from the external sensor, the manipulator may obtain second rotation angle information for the motors corresponding to the hand among the plurality of motors based on the sensing value and the equilibrium angle information in operation S830. When the second rotation angle information is obtained, the manipulator may control the motors corresponding to the hand based on the second rotation angle information in operation S840.

For example, the manipulator may obtain third rotation angle information for the motors corresponding to the hand based on the sensing value indicating the posture of the hand, and obtain the second rotation angle information by compensating the third rotation angle information based on the equilibrium information. For example, the manipulator may obtain the second rotation angle information according to the result of compensating the third rotation angle information by adding the equilibrium angle information to the third rotation angle information for the motors corresponding to the hand, and control the motors corresponding to the hand based on the obtained second rotation angle information.

According to the example described with reference to FIG. 8 above, as hand balancing is performed, which compensates the degree that the posture of the hand is warped with respect to the reference frame when the postures of the upper arm and the fore arm of the user's arm are given arbitrarily in consideration of the postures of the upper arm and the fore arm of the manipulator, posture errors that occur from the external sensor attached on the user's arm can be minimized or reduced, and the posture of the hand independent from the postures of the upper arm and the fore arm of the manipulator can be assumed. Also, in accordance thereto, the user can perform the desired task fast and elaborately.

Figure 9:
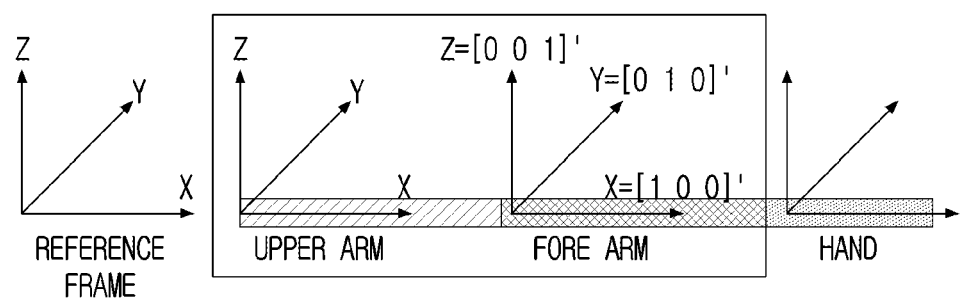
FIG. 9 is a diagram illustrating a frame and an example method for obtaining information for a body frame of a link corresponding to a fore arm according to various embodiments.

FIG. 9 is a diagram illustrating a frame and an example method for obtaining information for a body frame of a link corresponding to a fore arm according to various embodiments.

The frames illustrated in FIG. 9 respectively indicate the reference frame according to the disclosure and the body frames corresponding to the plurality of respective links included in the manipulator, e.g., the body frame corresponding to a user's upper arm, a body frame corresponding to a fore arm, and a body frame corresponding to a hand.

The yaw angle of the reference frame may refer, for example, to a frame that moves identically according to the yaw angle of the upper arm, and all body frames are interpreted based on the reference frame. The postures of the upper arm and the fore arm of the manipulator are determined according to the yaw angle and the pitch angle falling under rotations of the third axis and the second axis in the body frame of the upper arm of the manipulator, and the roll angle and the yaw angle falling under rotations of the first axis and the third axis in the body frame of the fore arm of the manipulator.

As described above, for controlling the posture of the manipulator's hand correctly, the posture of the upper arm and the posture of the fore arm of the manipulator should be considered. Thus, according to the conventional technology, a relative posture of the hand for the fore arm can be obtained by obtaining a frame conversion matrix between the body frame of the hand and the reference frame using quaternion information obtained from the IMU sensor and the geomagnetic sensor attached on the user's hand, obtaining an inverse matrix of the frame conversion matrix between the body frame of the fore arm and the reference frame using quaternion information obtained from the IMU sensor and the geomagnetic sensor attached on the fore arm of the user's arm, and then multiplying the inverse matrix of the frame conversion matrix obtained from the fore arm to the frame conversion matrix of the hand.

However, according to the conventional technology, in a process wherein a user bends and unfolds an arm, or raises and lowers an arm, an error may occur when the postures of the IMU sensor and the geomagnetic sensor attached on the user's arm change. For example, in case the user bent his arm, if the muscle of the upper arm is knotted, the tilt of the surface on which the sensors are mounted changes, and such a phenomenon is reflected to the quaternion information, and it may appear as a posture error of the upper arm. Also, in the case of the fore arm, a posture error may occur for a similar reason to the case of the upper arm. In addition, posture errors of the upper arm and the fore arm directly cause a posture error of the hand, and as a result, a user cannot perform an intuitive and fast task according to a difference between the posture of the actual hand and the posture of the manipulator's hand.

The disclosure addresses the problem of the conventional technology as described above, and according to the disclosure, when obtaining a posture of the fore arm, quaternion information obtained from the IMU sensor and the geomagnetic sensor mounted on the upper arm and the fore arm is not used, but quaternion information obtained based on the rotation angles of the motors mounted on the upper arm and the fore arm of the actual manipulator is used, and accordingly, the manipulator's hand is made to maintain equilibrium in the reference frame. This may refer, for example, to the posture of the manipulator's hand being influenced by the quaternion information obtained from the IMU sensor and the geomagnetic sensor attached on the user's hand.

Hereinafter, first, a method for indicating change of unit vectors according to change of postures of the upper arm and the fore arm in the reference frame if unit vectors on the x, y, and z axes of the fore arm body frame are respectively $X=[1,0,0]^T$, $Y=[0,1,0]^T$, $Z=[0,0,1]^T$ will be described with reference to the [Formula 13], [Formula 14], and [Formula 15], and then a process of obtaining a roll equilibrium angle and a process of obtaining a pitch equilibrium angle according to the disclosure will be described in greater detail below with reference to FIG. 10 and FIG. 11.

[Formula 13] expresses a process of obtaining converted vectors X1, Y1, and Z1 in the case of performing frame conversion for unit vectors X, Y, and Z through rotation of the yaw angle of the fore arm.

$$X1 = C1 * Y$$
$$Y1 = C1 * Y$$
$$Z1 = C1 * Z$$
$$C1 = \begin{bmatrix} \cos(yaw) & -\sin(yaw) & 0 \\ \sin(yaw) & \cos(yaw) & 0 \\ 0 & 0 & 1 \end{bmatrix}$$

[Formula 13]

[Formula 14] expresses a process of obtaining converted vectors X2, Y2, and Z2 in the case of performing frame conversion for vectors X1, Y1, and Z1 through rotation of the roll angle of the upper arm.

$$X2 = C2 * X1$$
$$Y2 = C2 * Y1$$
$$Z2 = C2 * Z1$$
$$C2 = \begin{bmatrix} 1 & 0 & 0 \\ 0 & \cos(roll) & -\sin(roll) \\ 0 & \sin(roll) & \cos(roll) \end{bmatrix}$$

[Formula 14]

[Formula 15] expresses converted vectors X3, Y3, and Z3 in the case of performing frame conversion for vectors X2, Y2, and Z2 through rotation of the pitch angle of the upper arm.

$$X3 = C3 * X2$$
$$Y3 = C3 * Y2$$
$$Z3 = C3 * Z2$$
$$C3 = \begin{bmatrix} \cos(pitch) & 0 & \sin(pitch) \\ 0 & 1 & 0 \\ -\sin(pitch) & 0 & \cos(pitch) \end{bmatrix}$$

[Formula 15]

Figure 10:
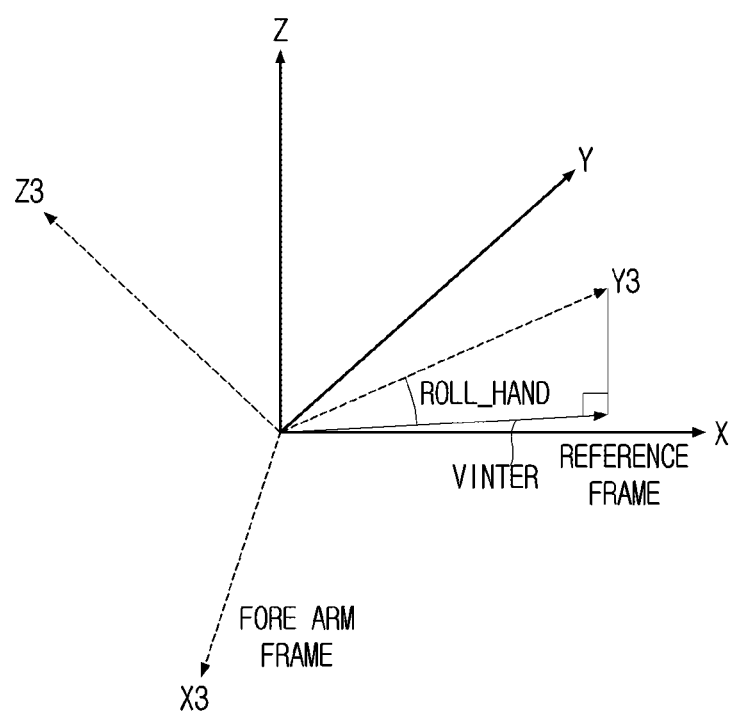
FIG. 10 is a diagram illustrating an example process of obtaining a roll equilibrium angle according to various embodiments.

Vectors X3, Y3, and Z3 are a result of interpreting X, Y, and Z which are unit vectors of the body frame of the fore arm of the manipulator in the reference frame through frame conversion, and this was expressed in FIG. 10. When the rotation amount of the two motors corresponding to the manipulator's hand is 0, the body frame of the fore arm is always identical to the body frame of the back of the hand. Accordingly, to make the body frame of the hand maintain an equilibrium state in the reference frame, it is only necessary to find a condition for equilibrium of X3, Y3, and Z3 in the body frame of the fore arm viewed from the reference frame. Explanation in this regard will be made in greater detail below with reference to FIG. 10 and FIG. 11.

FIG. 10 is a diagram illustrating an example process of obtaining a roll equilibrium angle according to various embodiments.

Referring to FIG. 10, a roll equilibrium angle (roll_hand in FIG. 10) that makes the vector Y3 exist on the XY plane of the reference frame in the case of performing frame rotation based on the vector X3 can be defined. That is, the roll equilibrium angle is the angle of the vector Y3 with the intersection vector Vinter of the Y3Z3 plane and the XY plane. The intersection vector Vinter can be calculated according to the following [Formula 16]. [Formula 16] includes a plurality of mathematical formulae and operation processes in that regard.

[Formula 16]

Mathematical formula of the XY plane: $z=0$

Mathematical Formula of the Y3Z3 Plane: $X3[0]*x+X3[1]*y+X3[2]*z=0$ (Meanwhile, $X3=[X3[0],X3[1],X3[2]]$)

If the two formulae are united, $X3[0]*x+X3[1]*y=0$ & $z=0$,

Accordingly, Vinter=$[-X3[1],X3[0],0]$.

The roll equilibrium angle can be calculated according to the following [Formula 17]. [Formula 17] includes a plurality of mathematical formulae and operation processes in that regard.

[Formula 17]

If the cross product of the vector Y3 and the vector Vinter is referred to as Vcross, Vcross=cross_product(Y3,Vinter).

If IVI is defined as the size of the vector V, if (Vcross[0]>=0)

roll_hand=$a$ sin(IVcrossI/IY3I/IVinterI)

else roll_hand=$-1.0*a$ sin(IVcrossI/IY3I/IVinterI)

if (X3[0]<0)

roll_hand=$-1.0*$roll_hand

Figure 11:
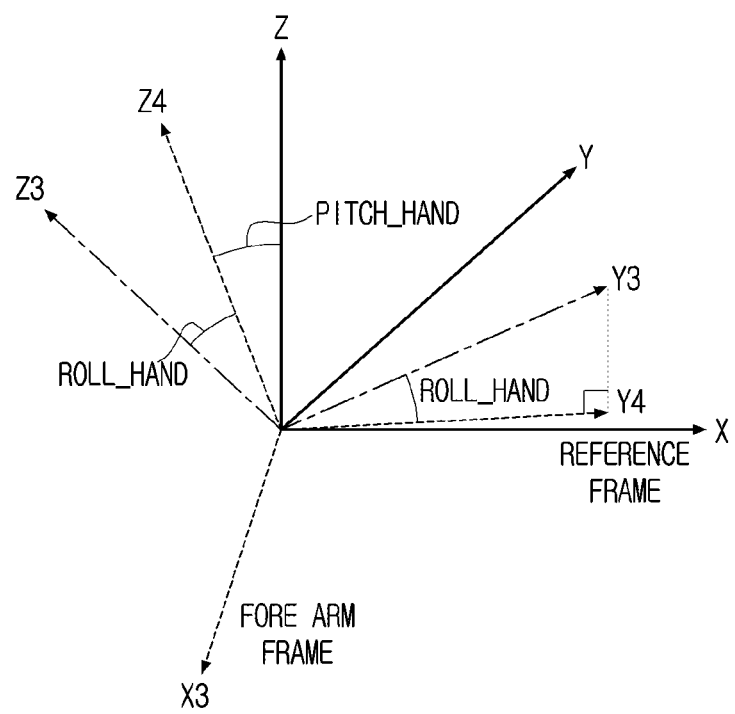
FIG. 11 is a diagram illustrating an example process of obtaining a pitch equilibrium angle according to various embodiments.

FIG. 11 is a diagram illustrating an example process of obtaining a pitch equilibrium angle according to various embodiments.

As illustrated in FIG. 11, in the case of rotating the vector Y3 and the vector Z3 as much as the rotation angle $-1.0*$roll_hand based on the vector X3, if the vectors are respectively converted to the vector Y4 and the vector Z4, the vector Y4 gets to exist on the XY plane of the reference frame.

If the angle of the vector Z4 and the unit vector Z of the reference frame may refer, for example, to the pitch equilibrium angle (pitch_hand in FIG. 11), in the case of rotating the vector X3 and the vector Z4 as much as $-1.0*$pitch_hand based on the vector Y4, the direction of the vector converted through the rotation of the vector Z4 is made to coincide with the Z axis direction of the reference frame, and the vector converted through the rotation of the vector X3 is made to exist on the XY plane of the reference frame. Accordingly, the hand balancing process according to the disclosure can be performed based on the roll equilibrium angle and the pitch equilibrium angle.

If the case wherein the vector Z3 coincides with the vector Z4 as it is rotated as much as the rotation angle $-1.0*$roll_hand based on the vector X3 is expressed using the definition of the quaternion information, it is as in the following

[Formula 18]. [Formula 18] includes a plurality of mathematical formulae and operation processes in that regard.

[Formula 18]

If the quaternion information is defined as $Q=[Q[0], Q[1],Q[2],Q[3]]$, the rotation vector of the quaternion information is $Xu=X3/|X3|$, and the rotation angle becomes the roll equilibrium angle.

$Q=[\cos(\text{roll\_hand}/2),\sin(\text{roll\_hand}/2)*Xu[0],\sin(\text{roll\_hand}/2)*Xu[1],\sin(\text{roll\_hand}/2)*Xu[2]]$ When the quaternion information is given, a frame conversion matrix Cq is calculated from this, and the rotation conversion vector Z4 of the vector Z3 can be obtained. The following [Formula 19] expresses this process. [Formula 19] includes a plurality of mathematical formulae and operation processes in that regard.

[Formula 19]

$Cq[0][0]=Q[0]*Q[0]+Q[1]*Q[1]-Q[2]*Q[2]-Q[3]*Q[3]$ $Cq[0][1]=2.0*(Q[1]*Q[2]-Q[0]*Q[3])$ $Cq[0][2]=2.0*(Q[1]*Q[3]+Q[0]*Q[2])$ $Cq[1][0]=2.0*(Q[1]*Q[2]+Q[0]*Q[3])$ $Cq[1][1]=Q[0]*Q[0]-Q[1]*Q[1]+Q[2]*Q[2]-Q[3]*Q[3]$ $Cq[1][2]=2.0*(Q[2]*Q[3]-Q[0]*Q[1])$ $Cq[2][0]=2.0*(Q[1]*Q[3]-Q[0]*Q[2])$ $Cq[2][1]=2.0*(Q[2]*Q[3]+Q[0]*Q[1])$ $Cq[2][2]=Q[0]*Q[0]-Q[1]*Q[1]-Q[2]*Q[2]+Q[3]*Q[3]$ $Z4=Cq*Z3$

The pitch equilibrium angle can be calculated according to the following [Formula 20]. [Formula 20] includes a plurality of mathematical formulae and operation processes in that regard.

$\text{Vcross}=\text{cross\_product}(Z,Z4)$ [Formula 20]

Here, Vcross=[Vcross[0], Vcross[1], Vcross[2]] may refer, for example, to the cross product of Z and Z4.

if (Vcross[0]>=0)

pitch\_hand=$a\sin(|\text{Vcross}|/|Z4|)$ else pitch\_hand=$-1.0*a\sin(|\text{Vcross}|/|Z4|)$ When the roll equilibrium angle and the pitch equilibrium angle are calculated according to the [Formula 17] and the [Formula 20], the manipulator may perform hand balancing by rotating the two motors corresponding to the hand as much as the roll equilibrium angle and the pitch equilibrium angle.

Figure 12:
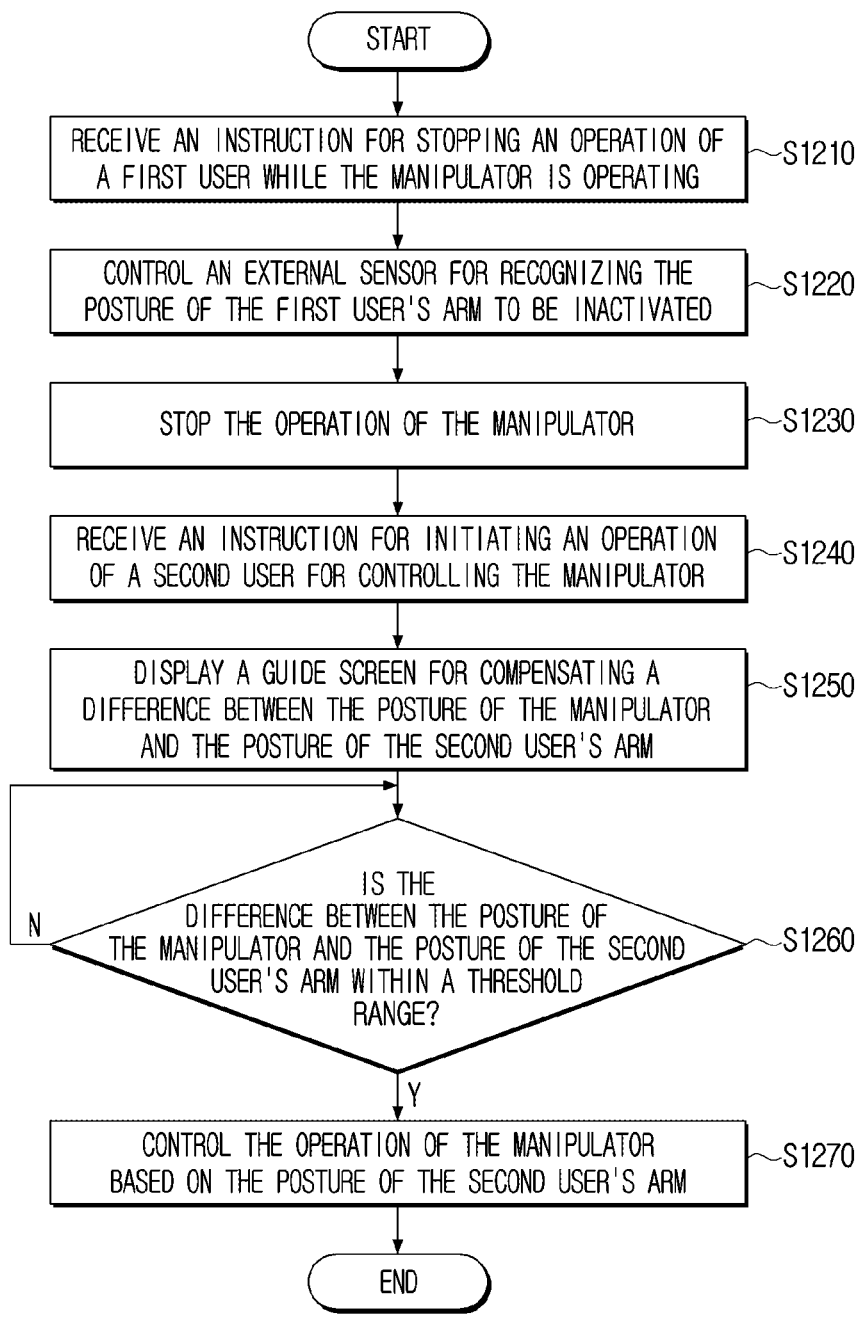
FIG. 12 is a flowchart illustrating an example process wherein a plurality of users control a manipulator according to various embodiments.

FIG. 12 is a flowchart illustrating an example process wherein a plurality of users control a manipulator according to various embodiments.

Embodiments regarding the process of obtaining input values of motors corresponding to the upper arm and the fore arm, and the hand balancing process as described above with reference to FIG. 1 to FIG. 11 can also be applied to a case wherein a plurality of users control one manipulator remotely.

Referring to FIG. 12, the manipulator may receive an instruction for stopping an operation of a first user while the manipulator is operating in operation S1210. When the instruction for stopping an operation of the first user is received, the manipulator may inactivate an external sensor for recognizing the posture of the first user's arm in operation S1220, and stop the operation of the manipulator in operation S1230.

For example, the manipulator may inactivate the external sensor by transmitting a control signal for inactivating the external sensor to the external sensor. Even if a sensing value is received from the external sensor after the instruction for stopping an operation, the manipulator may stop the operation of the manipulator by a method like not controlling the operation of the manipulator, etc. based on the received sensing value.

When an instruction for initiating an operation of a second user for controlling the manipulator is received in operation S1240, the manipulator may transmit information on a guide screen for compensating a difference between the posture of the manipulator and the posture of the second user's arm to the user terminal of the second user in operation S1250.

For example, the manipulator may transmit information on the guide screen to the user terminal of the second user, and thereby make the information displayed on the display of the user terminal of the second user.

The guide screen may include information on the posture of the manipulator according to the last posture of the first user's arm and information on the current posture of the second user's arm, and accordingly, the second user may change the posture of his arm to make the posture of his arm coincide with the posture of the manipulator according to the last posture of the first user's arm.

If it is identified that the difference between the posture of the manipulator and the posture of the second user's arm is within a threshold range in operation S1260-Y, the manipulator may control the operation of the manipulator based on the posture of the second user's arm in operation S1270. The manipulator may continuously or periodically identify whether the difference between the posture of the manipulator and the posture of the second user's arm is within the threshold range until it is identified that the difference between the posture of the manipulator and the posture of the second user's arm is within the threshold range in operation S1260-N.

Accordingly, in the case of the manipulator according to the disclosure, even when a plurality of users control the manipulator remotely, the plurality of users can understand the situation regarding the movement of the manipulator fast and attempt a proper control intuitively, and accordingly, the manipulator can be operated stably while continuity among the operations of the plurality of users is guaranteed. The example illustrated in FIG. 12 can also be applied to a case wherein one user controls manipulators located in several places.

FIG. 13 is a flowchart illustrating an example process of controlling a repeating operation of a manipulator according to various embodiments.

Embodiments regarding the process of obtaining input values of motors corresponding to the upper arm and the fore arm, and the hand balancing process as described above with reference to FIG. 1 to FIG. 11 can also be applied to a process wherein the manipulator performs a specific operation repetitively.

The manipulator may receive an instruction for initiating a repeating operation of a user in operation S1310. When the instruction for initiating a repeating operation of the user is received, the manipulator may control the operation of the manipulator based on the posture of the user's arm in operation S1320.

If an instruction for stopping the repeating operation of the user is received in operation S1330, the manipulator may store a control signal corresponding to the operation of the manipulator from the time point when the instruction for initiating the repeating operation was received to the time point when the instruction for stopping the repeating operation was received in operation S1340.

When the control signal corresponding to the operation of the manipulator is stored, the manipulator may transmit information for the maximum operating speeds of the respective motors of the manipulator corresponding to the control signal to the user terminal of the user in operation S1350. For example, the manipulator may transmit information for the maximum operating speeds of the respective motors of the manipulator corresponding to the control signal to the user's terminal, and thereby make the information displayed on the display of the user's terminal.

When a user input for setting the operating speed of the manipulator based on the information for the maximum operating speeds is received in operation S1360, the manipulator may control the manipulator based on the set operating speed in operation S1370.

For example, a user can designate the repeating speed of the manipulator within the maximum allowed torque ranges of the respective motors depending on needs, and accordingly, the user's work efficiency can be noticeably improved.

The various example embodiments described above may be implemented in a non-transitory recording medium that can be read by a computer or an apparatus similar to a computer, using software, hardware, or a combination thereof. In some cases, the embodiments described in this disclosure may be implemented as a processor itself. According to implementation by software, the embodiments such as procedures and functions described in this disclosure may be implemented as separate software modules. Each of the software modules can perform one or more functions and operations described in this disclosure.

Computer instructions for performing processing operations according to the aforementioned various embodiments of the disclosure may be stored in a non-transitory computer-readable medium. Computer instructions stored in such a non-transitory computer-readable medium may make the processing operations according to the aforementioned various embodiments performed by a specific machine, when the instructions are executed by the processor of the specific machine.

A non-transitory computer-readable medium may refer, for example, to a medium that stores data semi-permanently, and is readable by machines. As examples of a non-transitory computer-readable medium, there may be a CD, a DVD, a hard disc, a blue-ray disc, a USB, a memory card, a ROM and the like.

While the disclosure has been illustrated and described with reference to various example embodiments, it will be understood that the various example embodiments are intended to be illustrative, not limiting. It will be further understood by those skilled in the art, that various modifications may be made, without departing from the true spirit and full scope of the disclosure, including the appended claims and their equivalents. It will also be understood that any of the embodiment(s) described herein may be used in conjunction with any other embodiment(s) described herein.

What is claimed is:

1. A manipulator comprising:
   a plurality of links respectively corresponding to a user's upper arm, fore arm, and hand;
   a plurality of motors configured to rotate the plurality of links;
   a communication interface comprising communication circuitry;
   a memory storing at least one instruction; and
   a processor configured to execute the at least one instruction,
   wherein the processor is configured to:
   based on first rotation angle information for motors corresponding to the upper arm and the fore arm among the plurality of motors, obtain information for a body frame of a link corresponding to the fore arm,
   obtain equilibrium angle information positioning the body frame in equilibrium with a specified reference frame,
   based on receiving a sensing value indicating the posture of the hand from an external sensor through the communication interface, obtain second rotation angle information for motors corresponding to the hand among the plurality of motors based on the sensing value and the equilibrium angle information, and
   control the motors corresponding to the hand based on the second rotation angle information.

2. The manipulator of claim 1,
   wherein the processor is configured to:
   calculate a frame conversion matrix for converting the first rotation angle information into a sensing value indicating the posture of the upper arm and the posture of the fore arm, and
   obtain information for the body frame corresponding to the fore arm based on the frame conversion matrix.

3. The manipulator of claim 1,
   wherein the equilibrium angle information includes roll equilibrium angle information and pitch equilibrium angle information, and
   the roll equilibrium angle information indicates an angle that positions a second axis of the body frame parallel to an xy plane of the reference frame based on rotating around the body frame based on a first axis of the body frame.

4. The manipulator of claim 3,
   wherein the pitch equilibrium angle information indicates an angle that positions a third axis of the body frame to coincide with a z axis of the reference frame based on rotating around the body frame based on the second axis of the body frame rotated according to the roll equilibrium angle information.

5. The manipulator of claim 4,
   wherein the processor is configured to:
   obtain third rotation angle information for the motors corresponding to the hand based on the sensing value indicating the posture of the hand, and
   obtain the second rotation angle information by compensating the third rotation angle information based on the equilibrium angle information.

6. The manipulator of claim 5,
   wherein the plurality of links include a first link corresponding to the upper arm, a second link corresponding to the fore arm, and a third link corresponding to the hand, and the plurality of motors include a first motor configured to rotate the first link based on the first axis, a second motor configured to rotate the first link based on the second axis, a third motor configured to rotate the second link based on the first axis, a fourth motor configured to rotate the second link based on the third axis, a fifth motor configured to rotate the third link based on the first axis, and a sixth motor configured to rotate the third link based on the second axis.

7. The manipulator of claim 1,
wherein the processor is configured to:
based on receiving an instruction for stopping an operation of a first user while the manipulator is operating, inactivate an external sensor for recognizing the posture of the first user's arm, and stop the operation of the manipulator,
based on receiving an instruction for initiating an operation of a second user for controlling the manipulator, control the communication interface to transmit information on a guide screen for compensating a difference between the posture of the manipulator and the posture of the second user's arm to the user terminal of the second user, and
based on identifying a difference between the posture of the manipulator and the posture of the second user's arm being within a specified threshold range, control the plurality of motors based on the posture of the second user's arm.

8. The manipulator of claim 1,
wherein the processor is configured to:
based on receiving an instruction for initiating a repeating operation of the user, control the plurality of motors based on the posture of the user's arm,
based on receiving an instruction for stopping the repeating operation of the user, store a control signal corresponding to the operation of the manipulator from the time point when the instruction for initiating the repeating operation was received to a time point when the instruction for stopping the repeating operation was received in the memory,
based on the control signal being stored, control the communication interface to transmit information for the maximum operating speeds of the plurality of respective motors corresponding to the control signal to the user terminal of the user, and
based on receiving an input for setting the operating speed of the manipulator based on the information for the maximum operating speeds, control the plurality of motors based on the set operating speed.

9. A method for controlling a manipulator including a plurality of links respectively corresponding to a user's upper arm, fore arm, and hand, and a plurality of motors rotating the plurality of links, the method comprising:
based on first rotation angle information for motors corresponding to the upper arm and the fore arm among the plurality of motors, obtaining information for a body frame of a link corresponding to the fore arm;
obtaining equilibrium angle information that positions the body frame in equilibrium with a specified reference frame;
based on receiving a sensing value indicating the posture of the hand from an external sensor, obtaining second rotation angle information for motors corresponding to the hand among the plurality of motors based on the sensing value and the equilibrium angle information; and controlling the motors corresponding to the hand based on the second rotation angle information.

10. The method of claim 9,
wherein the obtaining information for the body frame comprises:
calculating a frame conversion matrix for converting the first rotation angle information into a sensing value indicating the posture of the upper arm and the posture of the fore arm; and
obtaining information for the body frame corresponding to the fore arm based on the frame conversion matrix.

11. The method of claim 9,
wherein the equilibrium angle information includes roll equilibrium angle information and pitch equilibrium angle information, and
the roll equilibrium angle information indicates an angle that positions a second axis of the body frame parallel to an xy plane of the reference frame based on rotating around the body frame based on a first axis of the body frame.

12. The method of claim 11,
wherein the pitch equilibrium angle information indicates an angle that positions a third axis of the body frame to coincide with a z axis of the reference frame based on rotating around the body frame based on the second axis of the body frame rotated according to the roll equilibrium angle information.

13. The method of claim 12,
wherein the obtaining the second rotation angle information comprises:
obtaining third rotation angle information for the motors corresponding to the hand based on the sensing value indicating the posture of the hand; and
obtaining the second rotation angle information by compensating the third rotation angle information based on the equilibrium angle information.

14. The method of claim 13,
wherein the plurality of links include a first link corresponding to the upper arm, a second link corresponding to the fore arm, and a third link corresponding to the hand, and
the plurality of motors include a first motor configured to rotate the first link based on the first axis, a second motor configured to rotate the first link based on the second axis, a third motor configured to rotate the second link based on the first axis, a fourth motor configured to rotate the second link based on the third axis, a fifth motor configured to rotate the third link based on the first axis, and a sixth motor configured to rotate the third link based on the second axis.

15. A manipulator comprising:
a plurality of links including a first link and a second link;
a plurality of motors configured to rotate the plurality of links;
a communication interface including a circuit;
a memory storing at least one instruction; and
a processor,
wherein the processor is configured to:
receive a sensing value of an external sensor for detecting a posture of a user's arm through the communication interface,
obtain a second vector corresponding to the posture of the user's arm based on a matrix obtained based on the sensing value and a first vector prestored in the memory,
obtain posture information of the user's arm based on the second vector, and control driving of the plurality of motors based on the posture information of the user's arm, and the processor is further configured to:

obtain a third vector corresponding to the first link based on a sensing value of a first external sensor, obtain a fourth vector corresponding to the second link based on a sensing value of a second external sensor, obtain posture information corresponding to the second link based on the third vector and the fourth vector, and control driving of the plurality of motors corresponding to the second link based on the posture information corresponding to the second link.

* * * * *